United States Patent [19]

Moffatt et al.

[11] Patent Number: 4,726,227

[45] Date of Patent: Feb. 23, 1988

[54] ANGULAR VELOCITY SENSOR HAVING LOW TEMPERATURE SENSITIVITY

[75] Inventors: E. Marston Moffatt, Glastonbury; Richard E. Swarts, Simsbury, both of Conn.

[73] Assignee: United Technologies Corporation, Hartford, Conn.

[21] Appl. No.: 663,525

[22] Filed: Oct. 22, 1984

[51] Int. Cl.$^4$ ............................................. G01P 3/28
[52] U.S. Cl. ................................ 73/505; 73/516 LM; 417/413
[58] Field of Search ............ 73/505, 516 R, 516 LM; 417/413

[56] References Cited

U.S. PATENT DOCUMENTS 2,312,712  3/1943  Hartline .............................. 417/413
3,381,623  5/1968  Elliott ................................. 417/413
3,587,328  6/1971  Schuemann .................... 73/516 LM
4,305,293  12/1981  Swarts ........................... 73/516 LM

FOREIGN PATENT DOCUMENTS

211561  12/1982  Japan ............................ 73/516 LM

*Primary Examiner*—Stewart J. Levy
*Assistant Examiner*—John E. Chapman, Jr.
*Attorney, Agent, or Firm*—Francis J. Maguire, Jr.

[57] ABSTRACT

An angular velocity sensor utilizing the Coriolis effect on a fluid jet employs a metal diaphragm impulse jet pump with no valves to reduce temperature sensitivity. The pump anvil, the nozzle block and the sensor plug may all be fabricated of the same material to further reduce temperature sensitivity. The thickness of the sensing elements is selected to reduce temperature sensitivity still further.

3 Claims, 8 Drawing Figures

ANGULAR VELOCITY SENSOR HAVING LOW TEMPERATURE SENSITIVITY

CROSS REFERENCE TO RELATED APPLICATIONS

The invention described herein may employ some of the teachings disclosed and claimed in commonly owned copending applications filed on even date herewith by Moffatt et al., U.S. Ser. No. 663,519, entitled IMPROVED JET FLOW IN AN ANGULAR VELOCITY SENSOR; and also by Moffatt et al., U.S. Ser. No. 663,518, entitled AN IMPULSE JET PUMP.

TECHNICAL FIELD

This invention relates to angular velocity sensors, and more particularly to angular velocity sensors having sensing elements cooled differentially by a fluid jet in the presence of sensor rotation.

BACKGROUND ART

Fluid jet angular velocity sensors utilizing sensing elements for sensing the speed of rotation are well known in the art. U.S. Pat. No. 3,500,690 to Schuemann, U.S. Pat. No. 4,020,700 to Lopiccolo et al., and U.S. Pat. No. 3,581,578 to Schuemann, all disclose fluid jet angular velocity sensors having a pair of sensing elements for sensing the speed of rotation about an axis perpendicular to a "plane of sensitivity".

The sensing elements are usually positioned symmetrically about a reference jet axis with each element on opposite sides and at equal distances therefrom. A fluid jet is directed along the reference jet axis from a nozzle which cools the sensing elements in substantially equal proportions in the absence of sensor rotation. Due to the well-known Coriolis effect, the fluid jet impinges nonsymmetrically, i.e., the fluid jet "bends" in the presence of sensor rotation. Because of the well-known characteristic of fluid jets in which the higher velocity fluid particles are concentrated at the center of the jet and the lower velocity particles around its periphery, the sensing elements are cooled in different proportions whenever the fluid jet impinges nonsymmetrically upon the sensing elements.

One source of unrepeatability in prior art angular rate sensors is caused by the basic properties of the piezoelectric material (PZT) used to construct the pump diaphragm. The PZT material is subject to temperature hysteresis. This shows up as a change, for example, in the pump impedance (and hence in the flowrate) at room temperature when the pump is either heated or cooled to the test limits of positive 155 degrees Fahrenheit or negative 35 degrees Fahrenheit and then returned to room temperature. This error (in terms of the original values) gradually disappears if the pump is kept at room temperature, but it can take as long as a week for this to occur. This phenomenon is well-known for materials with high dielectric constants and also affects capacitors.

The use of PZT pumps involves additional special problems. The optimum frequency is difficult to achieve using PZT diaphragms because the PZT pump cannot be driven harder than about six volts due to power supply limitations. In addition, with a PZT diaphragm, the deflection is a direct function of voltage and thickness. Changing the thickness is a very time consuming manufacturing operation and it has been found that there is a definite limit on minimum thickness because of manufacturing difficulties. Thus, both minimum frequency and maximum deflection are limited by properties of the PZT material itself.

The PZT pump suffers from differential expansion problems and PZT pumps require specialized manufacturing techniques. The PZT material has a very low coefficient of expansion which requires the anvil 28 to be made of INVAR to match it, but that results in an anvil material which does not match the coefficient of the nozzle block.

Another source of temperature sensitivity is the use of extremely thin sensing wires. A further source of temperature sensitivity is temperature hysteresis effects in the sensor itself.

Thus, in practice it has been found that angular velocity sensors of this type are highly sensitive to temperature variations. A need exists to find ways to minimize temperature sensitivity in angular rate sensors of this kind.

DISCLOSURE OF INVENTION

The object of the present invention is to minimize the temperature sensitivity of angular rate sensors over a wide temperature range.

According to the present invention an electromagnetically driven metal diaphragm pump is provided for use as an impulse jet pump in an angular rate sensor. The pump includes an anvil for mounting a flexure upon which the diaphragm is mounted. The pump also includes a magnetic core mounted within the anvil and having a drive coil wound thereon. The core provides a low reluctance path for magnetic drive flux in a magnetic drive circuit which includes the core, the diaphragm, and an air gap between the core and the diaphragm. An AC drive signal is provided to the drive coil and the resulting time-varying magnetic flux causes the diaphragm to vibrate in an oscillatory manner. The magnitude of the vibratory motion, i.e., the amplitude of the diaphragm displacement controls the fluid flow rate in the jet stream within the sensor. The pump also includes sensing poles with sensing coils wound thereon and mounted in quadrature with respect to the drive coil. The sensing poles provide a low reluctance path for magnetic sensing flux in a magnetic circuit in which a sensing signal is induced by virture of the vibratory motion of the diaphragm. The sensed signal is indicative of diaphragm displacement amplitude and frequency and is used by a control circuit to control the fluid flow rate.

In further accord with the present invention the sensor plug is made from the same material as the nozzle block.

In still further accord with the present invention, the nozzle block, the pump, and the plug are constructed of the same material in order to reduce temperature stresses.

In still further accord with the present invention, the diameter of the sensing wires are optimized to give less temperature sensitivity.

The present invention provides a highly effective means of improving temperature sensitivity in an angular rate sensor. The use of a metal diaphragm pump driven electromagnetically eliminates the temperatue hysteresis problem of the prior art and provides a higher mechanical Q which compensates for the theoretically less efficient electrical operation of a metal diaphragm. Since the electrical load of the pump is such a small part of the system power requirements (on the order of 1%) an increase in power required can be easily tolerated.

There are numerous advantages achieved by the use of a metal diaphragm pump. These include repeatability due to the absence of temperature hysteresis. Flexibility of design is enhanced with respect to certain voltage and frequency constraints to be described below. The optimum frequency for the best mode embodiment of the invention is difficult to achieve using PZT diaphragms.

A metal diaphragm pump can be made of a single material which can be matched to the nozzle block thus eliminating differential expansion problems. PZT material has a very low coefficient of expansion so the flexure and anvil are made of INVAR to match it, but this doesn't match the coefficient of the nozzle block.

Manufacturing of the electro-magnetic pump involves standard machining techniques with common materials so the choice of vendors is very wide, whereas the piezoelectric diaphragm is so specialized, that there are very few sources of supply.

Increasing the sensor wire diameter from the prior art diameter of $3.8 \times 10^{-6}$ meter to about $5 \times 10^{-6}$ meter makes the wire about 2.4 times as stiff and gives a more rugged wire which is more stable physically. This has less "curl" than the thinner wire which means that after it is attached, it should be straighter looking in the direction of the flow. This in turn means less temperature sensitivity.

Making the plug from the same material as the nozzle block, i.e., the same steel, provides the same coefficient of expansion as the nozzle block so that when the unit is temperature cycled there is less stress on the welds connecting the two. In the prior art, the plug is made from KOVAR for ease in glassing the pins. KOVAR has a much lower coefficient of expansion than the nozzle block so when the prior art unit is temperature cycled there is a very high stress on the welds connecting the two. However, if the nozzle block and the plug are made from the same steel, it is not as easy to glass, although glass compression seals are used successfully with stainless steel. An alternate attachment method using ceramic cement may be used.

The prior art jet sensor incorporates materials of three very different expansion coefficients. As described above, the nozzle block is austenitic stainless steel with the highest coefficient of expansion. The pump is INVAR with almost zero coefficient of expansion, and the plug is KOVAR with an intermediate coefficient. This also leads to high stresses in the plug weld with temperature cycling. The pump can't move with respect to the nozzle block under the same conditions and it is necessary to clamp the pump to the nozzle block with a spring. These temperature stresses contribute to nonrepeatability. By making everything out of a magnetic steel, e.g., the 400 series stainless steels (low carbon electrical steels), these stresses can be eliminated and the pump welded to the nozzle block. As a further bonus, the magnetic steel in the annealed state acts as a magnetic shield for the wires. (These wires can change calibration in a magnetic field, since they are carrying current, and the resulting magnetic force can bend them).

These and other objects, features and advantages of the present invention will become more apparent in light of the following detailed description of a best mode embodiment thereof, as illustrated in the accompanying drawing.

BEST MODE FOR CARRYING OUT INVENTION

Figure 1:
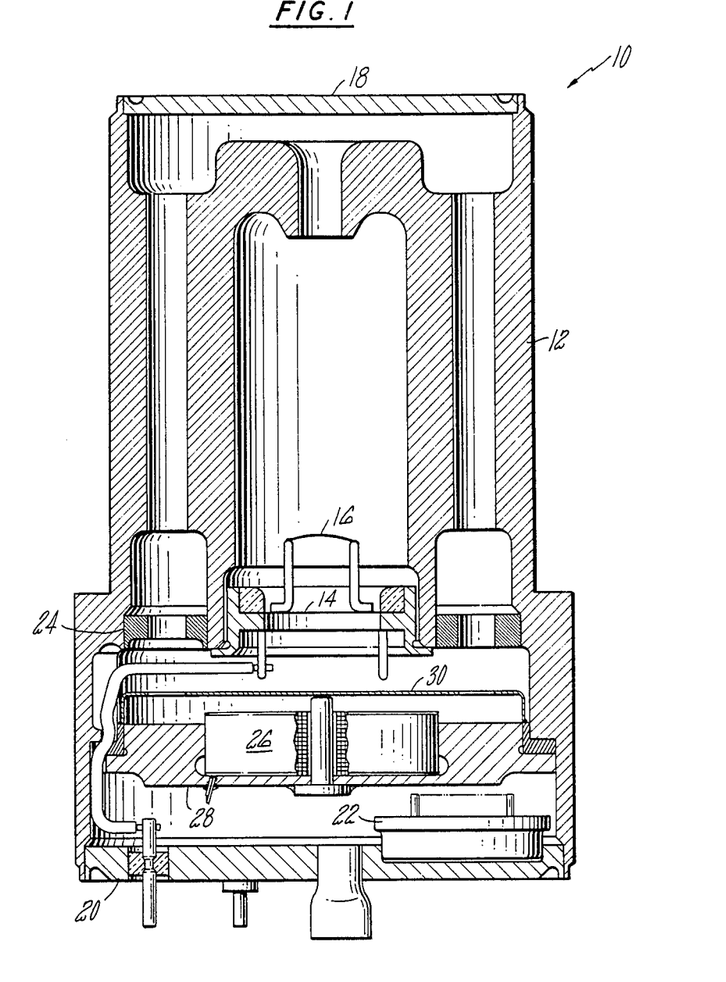
FIG. 1 is a cutaway illustration of an angular rate sensor.

FIG. 1 is a cutaway illustration of the interior of an angular rate sensor 10 according the present invention. The sensor assembly includes a nozzle block 12, a sensor plug 14 having a pair of sensor wires 16 (only one wire is shown in the illustration), an end cap 18, a header 20, and an electronics module 22 having bridge resistances and operational amplifiers, an alignment ring 24, a pump coil 26, a pump anvil 28, and a pump diaphragm 30.

Figure 2:
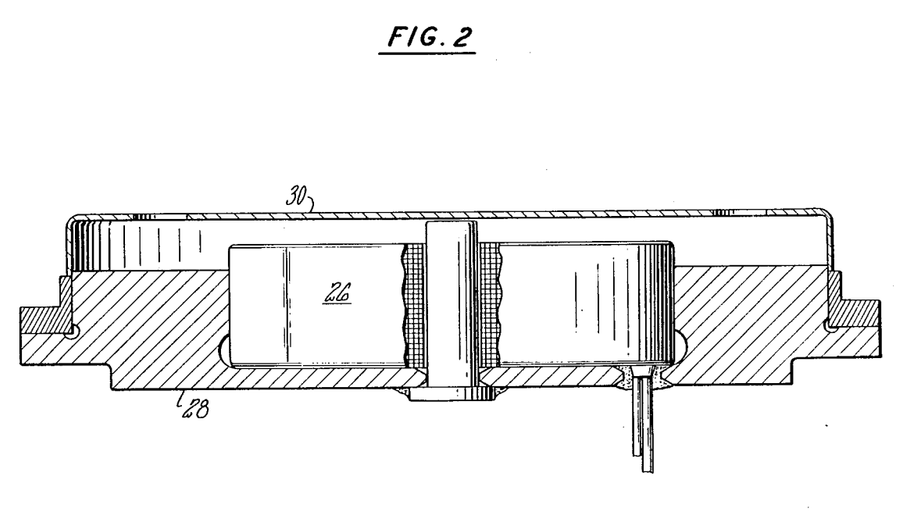
FIG. 2 is an enlarged view of the pump assembly of FIG. 1.

The pump of FIG. 1 is shown in more detail in FIG. 2. As described above, one source of unrepeatability in the sensor is caused by the basic properties of the piezoelectric material (PZT) used to construct the prior art pump diaphragm. Since PZT is subject to temperature hysteresis, temperature cycling will induce errors in the mechanical position of the diaphragm. Although these effects gradually disappear if the pump is kept at room temperature, it can take as long as a week for this occur.

Although the substitution of a metal diaphragm for a PZT diaphragm may result in less efficient electrical operation, an increase in mechanical Q compensates for this. Also, the electrical load of the pump is such a small part of the system power requirements (e.g., 0.060 watts vs. 7 watts) an increase in power required can be tolerated.

The mechanical operation of the metal diaphragm pump is identical to that of the PZT pump. It is an impulse jet pump with no valves and has the same volumes and clearances. The metal diaphragm has no temperature hysteresis, so the basic variability in output using a PZT diaphragm disappears.

The electro-magnetic design is much more flexible in designing to certain voltage constraints or desired frequency. There is no operating voltage limitation for the electromagnetic pump since the drive coil can be wound for any desired voltage by changing the number of turns.

As described in more detail below, the materials selected for the anvil, the diaphragm, and the other parts of the pump can be selected to minimize differences in expansion coefficients.

Figure 3A:
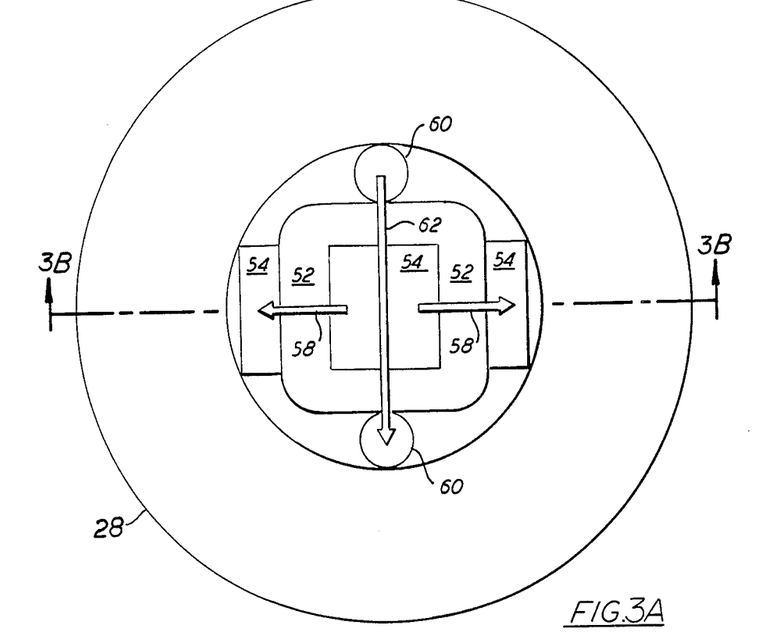
FIG. 3A is a plan and 3B a section view of an alternate pump assembly according to the present invention.
Figure 3B:
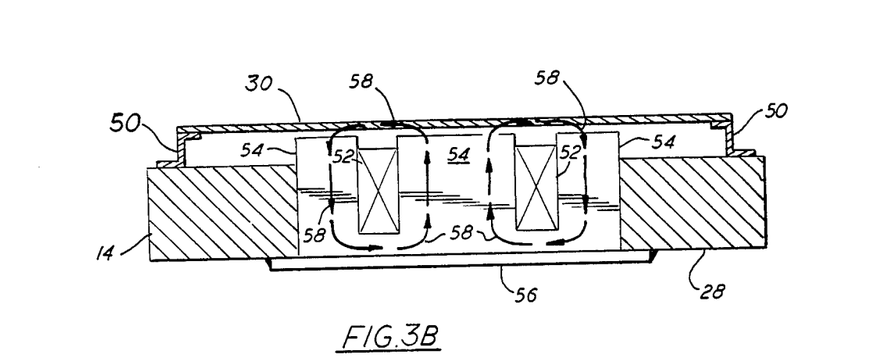

An alternate embodiment of the pump of FIG. 1 is shown in plan and in section views in FIG. 3. A metal diaphragm 30 is welded or soldered to a flexure 50 which is in turn welded to an anvil 28. A drive coil 52 is wound around the central post of a laminated core 54. A coil support plate 56 is welded to the anvil 28 to support the laminated core 54 and the drive coil 52.

The drive coil 52 produces magnetic flux which is shown pictorially by lines 58. The magnetic flux path includes a path through the laminated core 54, the air gap between the diaphragm 30 and the laminated core 54, the diaphragm 30 itself, and back through the air gap between the diaphragm and the outside of the laminated core. The diaphragm is caused to vibrate at a selected frequency by energizing the drive coil 52 at that frequency. The selected frequency is the resonant frequency of the diaphragm.

Sensing poles 60 are shown producing sensing flux 62 in gradrature with the drive flux 58. The sensing flux is used to sense the amplitude of the deflection and the frequency of the vibratory deflection motion with respect to the device's resonant frequency.

The diaphragm 30 and the core 54 are of magnetic steel such as the silicon alloys TRANSCOR or SILECTRON or a nickel-iron steel such as Allegany Ludlum 4750 or SUPERMALLOY. These steels have the same coefficients of expansion as the 400 series stainless steels so do not introduce temperature stresses. They have especially low magnetic hysteresis losses and when used in thin sheets (0.005–0.015 cm) have low eddy current losses so that electrical losses in the magnetic circuit are minimized.

The diaphragm 30 may be resistance-welded to a thin flexure 50 of compatible steel such as a 400 stainless steel. The flexure 50 may be resistance-welded to the stainless steel anvil 28.

This structure is similar to the prior art design using a PZT bi-morph for a diaphragm except that the prior art flexure 50 and anvil 28 were INVAR and the flexure was lead-soldered to the bimorph.

According to the present invention the flexures 50 are stamped parts and the diaphragms are cut from standard sheet stock so this part of the assembly is much cheaper than the prior art PZT structure.

The drive coil 54 may be a magnetic E-core structure, having three poles.

Figure 4:
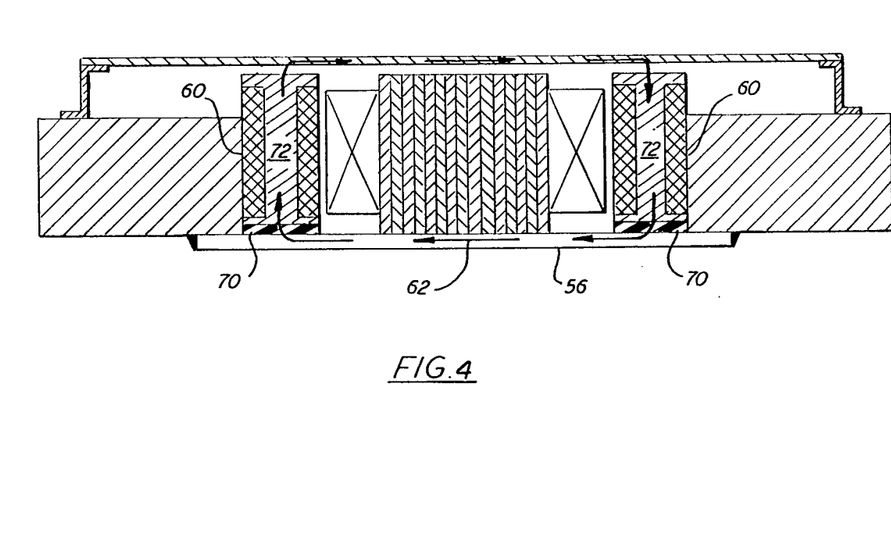
FIG. 4 is a section view of the pump of FIG. 3 showing sensing coils.

The additional sense poles 60 are shown in more detail in FIG. 4. The magnetic circuits of the drive and sense coils are independent of each other because they are arranged in quadrature. Thus the drive current will not induce any voltage in the sense coils. This is essential for the operation described below.

The sensing flux 62 of FIG. 4 is shown passing through the support plate 56 and through a pair of permanent magnets 70. The sensing flux is produced by the sensing coils 60 which are coiled around magnetic steel cores 72.

A magnetic device of the type shown in FIGS. 2, 3, and 4 requires a fixed DC magnetic bias for the drive circuit in addition to an AC magnetizing drive current. Of course, the bias could be supplied either by a permanent magnet in the circuit or by a DC current superimposed in the AC. However, it requires less power to use a DC bias current rather than magnets. This is because the magnets increase the magnetic reluctance of the drive coils so much that the total power consumption is greater. On the other hand, for the sense coils, magnets are preferred because these coils only produce a voltage which is fed into a high impedance electronic circuit. So, for the sensing coils, this type of bias simplifies the electronics and reduces power consumption. However, either method may be used.

The purpose of the sense coils is twofold:

(1) they measure diaphragm movement and thus supply a signal that can be amplified and used to control drive current at the proper phase angle to make the device automatically operate at its resonant frequency;

(2) they are used to measure the product of diaphragm displacement and frequency by using the following equations:

$$E = -10^{-8} N \frac{d\phi}{dt},$$

where,

N = No. of turns, and
$\phi$ = flux,

Since the flux varies inversely with the gap, with a fixed magnetic bias created by the permanent magnets, $$\frac{d\phi}{dt} = 2\pi f \phi_o \left[ \frac{\Delta g}{g_o} \right] \cos\omega t, \text{ and}$$

$$E_{max} = 10^{-8} N (2\pi f) \left[ \frac{\Delta g}{g_o} \right] \phi_o$$

where
f = frequency,
$\Delta g$ = air gap variation due to diaphragm movement,
$g_o$ = mean air gap, and
$\phi_o$ = mean flux.

Since N, $g_o$, and $\phi_o$ are fixed, $E_{max}$ is proportional to:

$$(f \cdot \Delta g).$$

This quantity is proportional to the volumetric displacement of the pump which in turn determines the flow rate through a fixed nozzle.

Thus the absolute voltage from the sense coils can be used as a feedback control signal for controlling the drive current. By programming the desired sense voltage at each temperature, the flow rate can be set independently of any changes in the pump hysteresis characteristics.

It should be noted that a diaphragm can be driven with an AC current alone without any bias flux or current but it will then run at double the line frequency. This mode entails higher electrical losses and makes operation at self-resonance more difficult. Therefore it is less desirable than the method described above.

Figure 5:
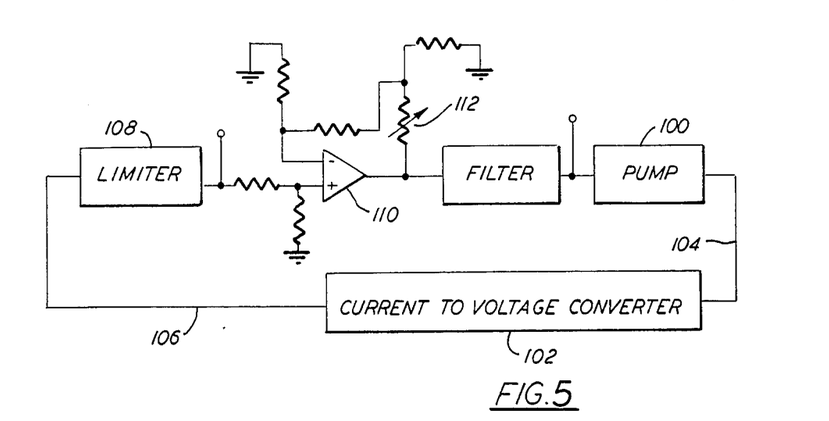
FIG. 5 is a simplified block diagram illustration of a drive circuit for driving the metal diaphragm pump shown in FIGS. 1 & 2.

Referring now to FIG. 5, a block diagram illustration of a circuit for driving the metal diaphgram pump of FIGS. 1 & 2 is shown. The block diagram illustrates an oscillator circuit having the textbook amplification equation of:

$$K_R = \frac{K}{1 - \beta K}$$

Where
K = the amplification of the oscillator amplifier,
$\beta$ = the ratio of the feedback voltage to the output voltage, and
$K_R$ = the ratio of the output signal voltage to the input signal voltage.

For oscillation to occur, the magnitude $\beta K$ must equal unity and the phase angle must equal zero or some whole number multiple of 360°. The circuit includes a pump 100, a current to voltage converter 102 which may be viewed as converting the pump current on line 104 to a voltage on line 106, a limiter 108, and an amplifier 110 whose gain is controlled by a thermister 112. The ability of the circuit of FIG. 5 to change the pump flow rate by using thermister 112 to change the gain of amplifier 110 in relatively poor in certain extreme temperature ranges.

Figure 6:
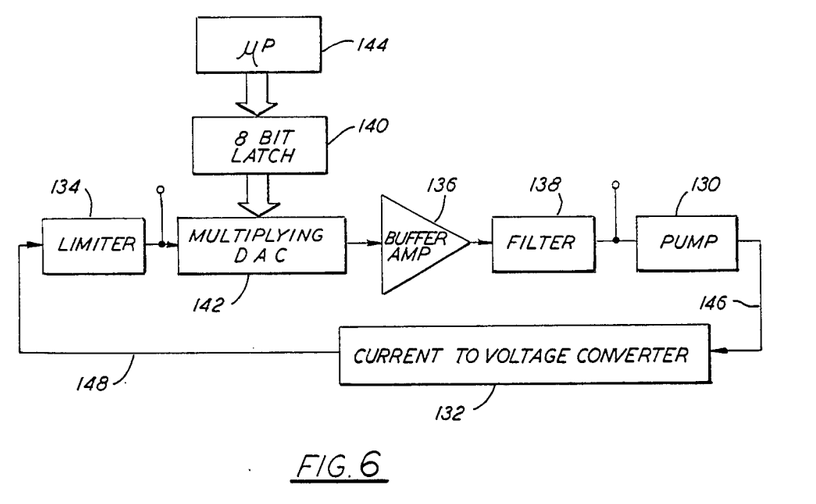
FIG. 6 is a simplified block diagram illustration of a drive circuit for driving the metal diaphragm pump of FIGS. 3 & 4.

FIG. 6 shows a drive circuit for driving the metal diaphgram pump of FIGS. 3 & 4. It also includes a pump 130, a current to voltage converter 132, an amplifier 136, and a filter 138. However, the circuit of FIG. 6 also contains an 8-bit latch which, in conjunction with a multiplying DAC, performs as an electronic attenuator under software control as dictated by a microprocessor 144. The pump current on a line 146 is converted to a voltage on a line 148 by means of the I TO V converter 132, passed through the limiter 134 and then applied to the input of the multiplying DAC 142. The attenuated signal is then buffered in the buffer amplifier 136, filtered in the filter 138 to produce a sinusoidal voltage signal to drive the pump 130. The voltage applied to the pump determines the diaphragm's oscillatory amplitude, and hence the flow rate of the the jet. By means of calibration software the desired pump voltage versus temperature can be obtained automatically with the resulting look up tables stored in EPROM. In the design of FIG. 5, a manual trim must be inserted to set the nominal pump voltage and the temperature compensation is obtained by use of the thermister 112. This method has its limitations. The programmable version of FIG. 6, on the other hand, allows the pump to be fine-tuned by setting the DAC to the desired attenuation throughout the temperature range. The diaphragm is caused to vibrate at a selected frequency by energizing the drive coil 52 at that frequency. The selected frequency is the resonant frequency of the diaphragm.

Figure 7:
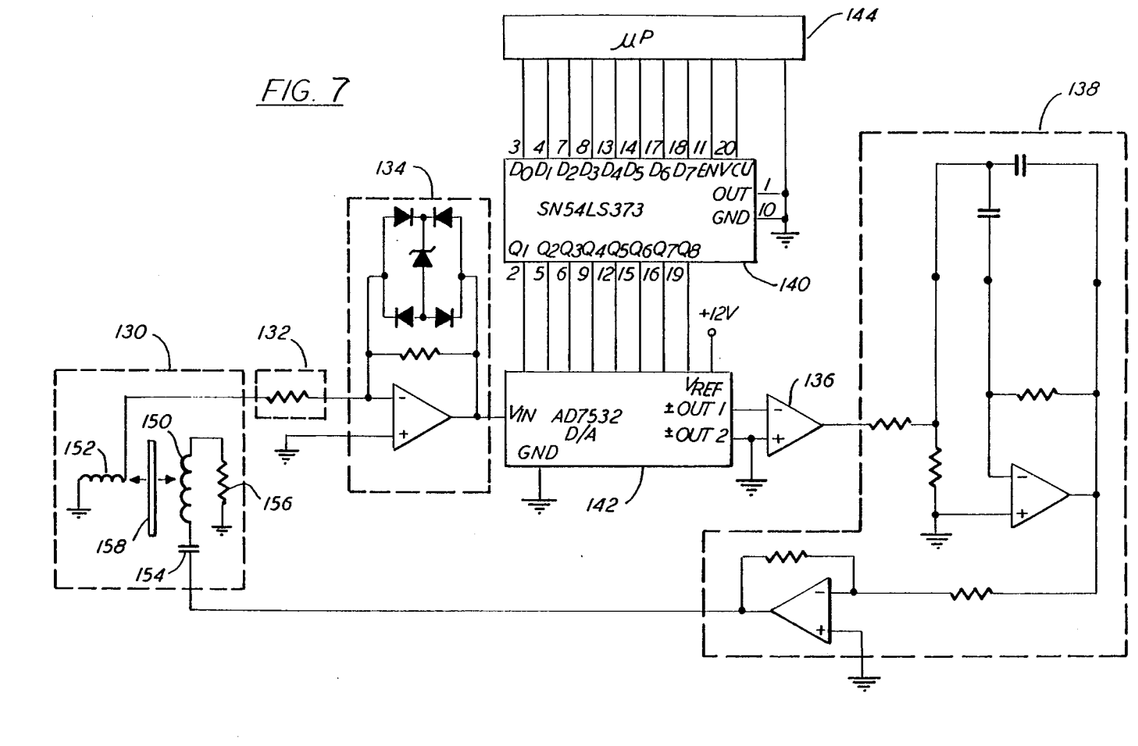
FIG. 7 is a more detailed schematic block diagram illustration of the circuit of FIG. 6.

FIG. 7 is a more detailed illustration of the circuitry of FIG. 6. The illustration of FIG. 7 is provided merely to show one implementation of the concepts presented in FIG. 6. Of course, it should be understood that FIG. 6 itself is merely one of many possible circuit variations which may be used to carry out the invention.

The pump 130 of FIG. 7 is shown having a drive coil 150 and a sense coil 152. The drive coil 150 is part of a series resonant circuit which includes a capacitor 154 and a resistor 156. The series resonant circuit is driven at its resonant frequency by the amplifier 132. This causes a diaphragm 158 to vibrate because of the manner in which the magnetic circuit is formed. The sensing coil 152 is arranged in quadrature with respect to the drive coil 150 and therefore does not couple any of the drive current. However, the diaphragm also forms part of a magnetic circuit which includes the sensing coil's core and the diaphragm's oscillatory movement is picked up by the sensing coil 152 by virtue of Faraday's Law (there is a permanent magnet in the sensing coil's magnetic circuit). Thus, the sensing coil provides a feedback signal to the drive circuitry. Since the gain is preselected to a value of unity the oscillations in the drive coil are sustained.

Referring back to FIG. 1, less temperature sensitivity of the sensor is additionally achieved by increasing the sensor wire 16 diameter from the prior art diameter of $3.8 \times 10^{-6}$ meter to about $5 \times 10^{-6}$ meter. This is about 2.4 times as stiff and gives a more rugged wire which is more stable physically. It has less curl than the thinner wire which means that after it is attached, it should be straighter looking in the direction of the jet flow. This in turn means less temperature sensitivity.

The nozzle block 12 is made of the same material as the plug 14, i.e., the same steel. The prior art plug was made from KOVAR for ease in glassing the pins. (The pins are glassed in order to provide electrical insulation from the plug). KOVAR has a much lower coefficient of expansion than a steel nozzle block. When the prior art units were temperature cycled there was a very high stress on the welds connecting the two.

As described above, a steel plug material may not be as easy to glass, although glass compression seals are used successfully with stainless steel. An alternate attachment method using ceramic cement may be used.

The prior art jet incorporates materials for the nozzle block 12, the plug 14, and the pump anvil 28, of three very different expansion coefficients.

The prior art nozzle block is austenitic stainless steel with the highest coefficient. The prior art pump is INVAR with almost zero coefficient and the prior art plug is KOVAR with an intermediate coefficient. This leads to high stresses in the plug weld with temperature cycling. The pump can move with respect to the nozzle block under the same conditions and it is necessary to clamp the pump to the nozzle block with a spring.

These temperature stresses contribute to nonrepeatability. By making everything out of a magnetic steel, e.g., the 400 series stainless steels, these stresses can be eliminated and the pump welded to the nozzle block. As a further bonus, the magnetic steel in the annealed state acts as a magnetic shield for the wires. These can change calibration in a magnetic field since they are carrying current and the resulting magnetic force can bend them. Thus, these effects are eliminated.

Although the invention has been shown and described with respect to a best mode embodiment thereof, it should be understood by those skilled in the art that the foregoing and various other changes, omissions, and additions in the form and detail thereof may be made therein without departing from the spirit and scope of this invention.

That which we claim, and desire to secure by Letters Patent, is:

1. Angular velocity sensor means, comprising:
    a nozzle block of a first selected material for enclosing a jet chamber having a reference jet axis and having nozzle means disposed at one end of said chamber for discharging a fluid jet along said reference jet axis;
    a sensor plug of a second selected material having at least one pair of sensing elements mounted thereon, said plug disposed at an opposite end of said chamber such that said sensing elements are disposed symmetrically about said reference jet axis in a plane perpendicular thereto, each pair of sensing elements being cooled differentially in response to deflection of said fluid jet from said referenced jet axis in the presence of sensor rotation about a rotation axis perpendicular to said reference jet axis, said deflection being in proportion to the angular velocity of said sensor, each of said sensing elements having resistance values which vary according to the amount of cooling received by each;
    a pump having an anvil of a third selected material for mounting a magnetic steel diaphragm thereon, said anvil being attached to said nozzle block, said pump having a magnetic steel laminated core having a drive coil wound thereon, said core providing a low reluctance path for magnetic drive flux in a magnetic drive circuit including said core, said magnetic steel diaphragm, and a gap between said core and said diaphragm, said pump having a magnetic flux sensing circuit including sensing poles having a sensing coil wound thereon, and means for producing magnetic sensing flux in a low reluctance path including said poles, said diaphragm, and a gap between said poles and said diaphragm and wherein said sensing coils are disposed in quadrature with respect to said drive coil for detecting said magnetic sensing flux and providing a sensing signal indicative of diaphragm displacement amplitude and frequency, said pump for delivering a fluid under pressure to said nozzle means to form said fluid jet; and detector circuit means, responsive to said sensing elements' resistance values for providing signals indicative of said angular velocity.

2. The sensor of claim 1, wherein said means for producing magnetic sensing flux includes permanent magnets.

3. The sensor of claim 1, wherein said angular velocity sensor further comprises:
  oscillator circuit means, having said drive coil connected in a resonant circuit, said oscillator circuit responsive to a feedback signal, for providing drive current to said drive coil for driving said resonant circuit substantially at its resonant frequency at a substantially constant amplitude; and
  feedback circuit means, responsive to said sensing signal for providing said feedback signal in phase for overcoming energy losses in said resonant circuit, thereby sustaining said frequency and said amplitude.

* * * * *